United States Patent

[11] 3,634,672

[72] Inventor Preston A. Weatherred, Jr.
 2239 Bissonet, Houston, Tex. 77005
[21] Appl. No. 13,457
[22] Filed Feb. 24, 1970
[45] Patented Jan. 11, 1972

[54] PRODUCT FUNCTION ROOT EXTRACTOR
 8 Claims, 4 Drawing Figs.
[52] U.S. Cl............................................. 235/193.5,
 235/151.34, 235/194, 250/204, 318/640
[51] Int. Cl..................................................... G06g 7/20,
 G01j 1/36
[50] Field of Search........................................ 235/193.5,
 151.34, 194, 198, 179; 356/222, 225, 233, 157,
 171; 250/204, 229; 318/640

[56] References Cited
UNITED STATES PATENTS
2,712,415  7/1955  Piety ........................... 356/157

| | | | |
|---|---|---|---|
| 3,135,903 | 6/1964 | Tomer........................... | 318/640 |
| 3,193,744 | 6/1965 | Seward......................... | 318/640 X |
| 3,392,283 | 7/1968 | Tomer........................... | 250/204 |
| 3,416,885 | 12/1968 | Townsend.................... | 250/204 X |

Primary Examiner—Joseph F. Ruggiero
Attorney—Carlos A. Torres

ABSTRACT: An illustrative embodiment of the present invention includes analog computing apparatus for determining the square root of the product of two mathematical input functions. The apparatus includes a centrally disposed light source and a pair of light masks having variable apertures. The aperture area of the first mask is continuously maintained square in shape and the aperture area of the second mask is varied according to the product of the two input functions. Light-sensitive means are provided to equalize the aperture areas of the two masks whereby the length of one side of the square aperture at equilibrium is proportional to the square root of the product of the input functions.

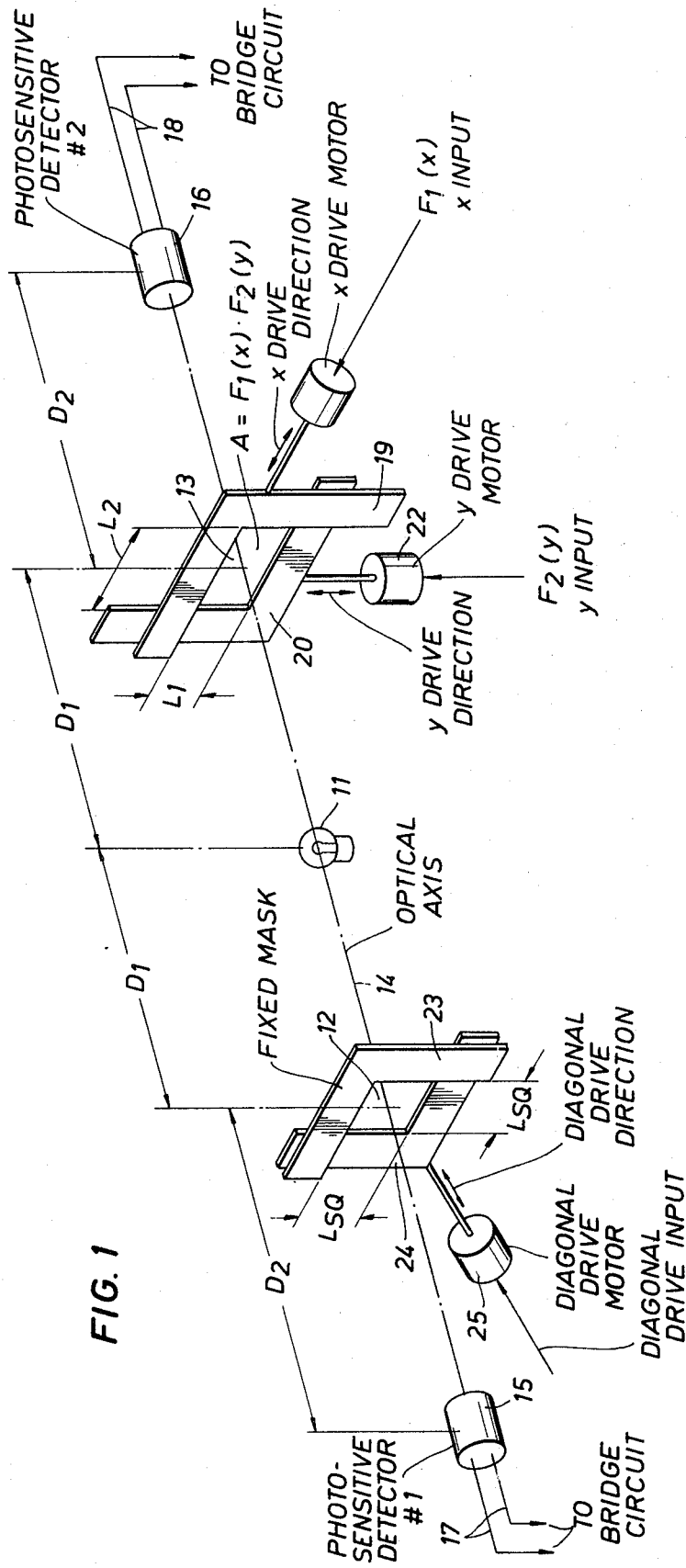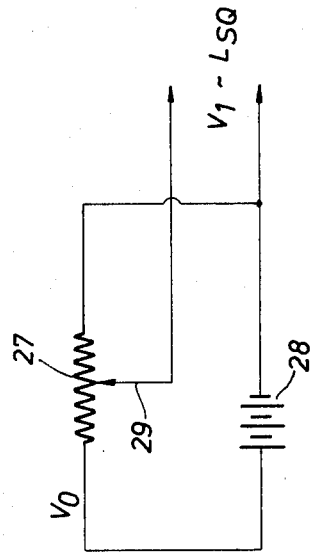

Preston A. Weatherred, Jr.
INVENTOR

BY Carlos A. Torres

ATTORNEY

PRODUCT FUNCTION ROOT EXTRACTOR

BACKGROUND OF THE INVENTION

This invention relates to analog computing apparatus and more particularly to such apparatus designed to extract the square root of the product of two mathematical functions.

It frequently occurs in the scientific and engineering disciplines that the square root of the product of two mathematical functions which may be rather complex in their behavior must be extracted in the course of the observation of a physical quantity. Such root extraction may be performed by the use of laborious hand calculations, the use of a slide rule, or in more recent days, by the use of complex digital computing apparatus. Of these prior methods, of course, the latter is the more desirable but has serious economical drawbacks when applied to observations on a small scale. However, when such observations on a small scale must be made over an extended period of time, hand computations are impractical as it becomes necessary to monitor the operation around the clock in order to perform them. Otherwise it becomes necessary to record the behavior of the complicated mathematical functions, the square root of whose product is to be extracted, and later to perform the calculations by hand in one session for numerous of these measurements taken over a longer period of time.

An automatic alternative to the hand computations but not on the scale of complexity of a digital computer, could provide a means for performing the necessary computations at reasonable cost on a continuous basis so that the observational data may be readily available for inspection at any time. A relatively uncomplicated analog device may be utilized for this purpose.

Accordingly, it is an object of the present invention to provide an economical analog computing apparatus which may be utilized to compute the square root of the product of two mathematical functions.

Another object of the present invention is to provide a dependable yet economical square root extraction device which may be used on a continuous basis.

SUMMARY OF THE INVENTION

In accordance with the objects of the present invention, analog computing apparatus is provided for extracting the square root of the product of two mathematical functions. The apparatus includes a light source and two variable aperture light masks together with means for monitoring the quantity of light passing from the light source through each of the variable aperture masks. The first variable aperture mask is adjustable in aperture area by moving its constituent parts in two dimensions. This mask's aperture area may thus be made to correspond to the behavior of the mathematical functions whose product is to be determined and whose square root is to be taken. The aperture area of the second variable light mask is adjustable by means responsive to an error signal which is proportional to the quantitative difference of light passing through each of the two masks. In accordance with the teachings of the present invention, the aperture shape of the second light mask is always maintained square. Since the aperture areas of the two masks are forced to be equal at any instant in time, the length of a side of the square aperture of the second mask is representative of the square root of the product of the two functions which determine the area of the first mask's aperture.

The foregoing and other objects, features and advantages of the present invention will become apparent from the following detailed description thereof when taken in conjunction with the accompanying drawings and claims.

BRIEF DESCRIPTION OF THE DRAWINGS

FIG. 1 is a schematic diagram illustrating the overall layout of the apparatus of the present invention;

FIG. 4 is a circuit diagram illustrating circuitry which may be utilized to produce the output signal of the present invention in electrical form.

DESCRIPTION OF THE PREFERRED EMBODIMENT

Referring now to FIG. 1, apparatus in accordance with the principles of the present invention is illustrated schematically. A light source 11 is centrally and symmetrically disposed along an optical axis 14 between two variable aperture light masks 12 and 13. Further disposed along the optical axis 14 and exterior to the variable aperture masks 12 and 13 are a pair of photosensitive detector devices 15 and 16 which may be cadmium sulfide cells or other suitable means.

Figure 2:
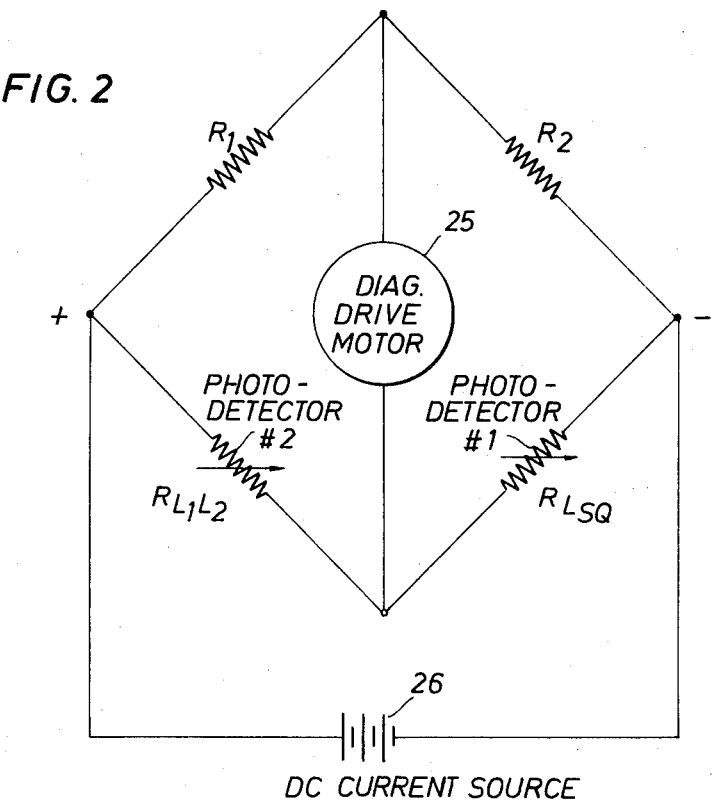
FIG. 2 is a circuit diagram illustrating one circuit means which may be utilized to obtain the equalization of aperture areas of the variable aperture masks of the present invention.

Lead wire pairs 17 and 18 connect the photosensitive detector devices 15 and 16 respectively to the bridge circuit illustrated in FIG. 2. The function of this circuit will be discussed subsequently. It should be noted that the light source 11 is disposed an equal distance $D_1$ from each of the variable aperture optical masks 12 and 13 and that the photosensitive detectors 15 and 16 are further disposed along the optical axis 14 at equal distances $D_2$ behind their respective optical masks. Thus the quantity of light passing through the variable aperture masks 12 and 13 and impinging upon the photosensitive detectors 15 and 16 is directly proportional to the aperture area of each of the variable aperture optical masks. While no lenses have been illustrated in the drawing for the sake of clarity, it will be appreciated by those skilled in the art that the light source 11 could be collimated by an appropriate lens system and the apertures of masks 12 and 13 imaged onto the photocells similarly.

Referring now to the variable aperture masking arrangement 13 of FIG. 1, it will be seen that the masking system includes two L-shaped opaque mask sections or brackets 19 and 20. The L-shaped brackets 19 and 20 may be constructed of any suitable material such as metal or plastic and preferably should be painted black to eliminate any stray reflections which may occur in the optical system. The L-shaped bracket 19 is driven through a gear system (not shown) by an X-coordinate drive motor 21 which may be a reversible DC motor or other suitable device. Drive motor 21 drives the L-shaped bracket 19 in the direction indicated by the arrows marked "X-DRIVE DIRECTION" by an amount proportional to the voltage input to the drive motor. Similarly, a Y-coordinate drive motor 22 which may also be a reversible DC motor, drives the L-shaped bracket 20 in the vertical or Y-direction by an amount proportional to the voltage input to the motor. Thus if the input signals to the drive motors 21 and 22 are referred to respectively as: $F_1(x)$ and $F_2(y)$, the area of the variable aperture formed by the L-shaped brackets 19 and 20 is equal to the product: $[F_1(x)][F_2(y)]$. Consequently, as previously discussed, the quantity of light falling on photosensitive detector 16 is directly proportional to this same product.

Referring now to the variable aperture masking system 12, shown to the left of light source 11 in FIG. 1, it will be noted that this variable aperture mask consists of a fixed L-shaped mask section or bracket 23 and a diagonally movable L-shaped mask section or bracket 24 which is driven by a diagonal drive motor 25. Motor 25 may similarly be a reversible DC motor or other suitable means. It should be noted that since the L-shaped bracket 24 is driven in a diagonal direction by the drive motor 25, that the geometrical shape of the aperture of the variable aperture system 12 is always square in shape. By contrast, the aperture shape of variable aperture mask 13 may assume any rectangular shape depending upon the value of the two input functions $F_1(x)$ and $F_2(y)$. If the driving signal applied to the diagonal drive motor 25 is appropriately derived, the area of the variable aperture mask 12 may be made equal to the area of the variable aperture mask 13. It is the function of the circuit shown in FIG. 2 to provide the diagonal drive signal to motor 25 to provide such a signal to produce equal area apertures in the variable aperture masking systems 12 and 13.

Referring now to FIG. 2, the diagonal drive motor 25 is shown connected across the arms of a Wheatstone Bridge-type circuit comprised of resistors $R_1$, $R_2$ and $R_{L1,L2}$ and $R_{LSQ}$. A DC current source 26 provides energy to energize the bridge arrangement illustrated. The resistor $R_{L1,L2}$ shown in the bridge represents the resistance of the photosensitive detector 16 of FIG. 1, while the resistance $R_{LSQ}$ represents the resistance of photosensitive detector 15 of FIG. 1. In the circuit of FIG. 2, the values of fixed resistors $R_1$ and $R_2$ are chosen such that, when the variable aperture masks have equal aperture areas, no potential difference will exist across the diagonal drive motor 25. That is to say, the resistors $R_1$ and $R_2$ may be thought of as calibration resistors which are used to null the Wheatstone Bridge circuit with the variable aperture masks set to equal aperture areas. This may be necessary in some cases to equalize the responses of the photosensitive detectors 15 and 16, however, these detectors are preferably chosen as a matched pair with equal response characteristics.

The operation of the apparatus shown in FIGS. 1 and 2 when used for extracting the square root of the product of two functions may be described as follows: Signals representative of the two input functions $F_1(x)$ and $F_2(y)$ are applied respectively to the X-drive motor 21 and the Y-drive motor 22. The input signals drive the L-shaped brackets 19 and 20 to produce an aperture area in the variable aperture system 13 which is proportional to the product $F_1(x) F_2(y)$. This area will permit a certain quantity of light, say $I_0$ to fall on the photosensitive detector 16 which in turn establishes an effective resistance of the photosensitive element equal to $R_{L1,L2}$. When this occurs, the bridge circuit of FIG. 2 becomes unbalanced and causes a potential difference to exist across the diagonal drive motor 25. The resultant potential difference in turn causes the diagonal drive motor 25 to move the single L-shaped bracket 24 of the variable aperture system 12 in such a direction as to equalize the aperture area of the system 12 with the aperture area of the system 13. When the aperture areas of the two systems 12 and 13 are equal, the quantity of light falling on the photosensitive detector 15 is equal to that falling on the photosensitive detector 16 and hence, the resistance $R_{LSQ}$ in the bridge circuit is equal to the resistance $R_{L1,L2}$. At this time, the bridge arrangement of FIG. 2 is again balanced with no potential difference existing across the diagonal drive motor 25. Hence, the diagonal motion of the L-shaped bracket 24 ceases as the apparatus has reached its equilibrium condition. With the apparatus at equilibrium, the length of one side of the square aperture area of the system 12 is equal to the square root of the product of the functions $[F_1(x)][F_2(y)]$. Thus, the device is capable of extracting the square root of the product of two functions.

The length of the side of the square aperture of variable aperture system 12 may be manually measured and recorded if desired or a simple calibrated potentiometer arrangement may be utilized as shown in FIG. 4 to produce an output voltage proportional to the length. In the arrangement of FIG. 4, a DC voltage source 28 supplies a potential $V_0$ across a potentiometer 27. The potentiometer 27 is calibrated in terms of the length of the side of the square of the variable aperture system 12. The wiper arm 29 of the potentiometer arrangement shown in FIG. 4 is connected to the bracket 24 by a linkage (not shown) which allows motion in one direction only, say the vertical. Hence, the voltage $V_1$ which is measured at the wiper arm 29 of the potentiometer of FIG. 4 is proportional to the length L of one side of the square aperture of the variable aperture system 12. This voltage signal output $V_1$ is therefore, directly proportional to the square root of the product of the two functions $[F_1(x)][F_2(y)]$. When the bridge circuit of FIG. 2 is unbalanced a suitable gating means (not shown) can be utilized to prevent the output of a voltage signal $V_1$ until the bridge has been brought to a balanced condition. Thus, the output signal from the potentiometer arrangement shown in FIG. 4 may be recorded automatically by a suitable recording apparatus.

Figure 3:
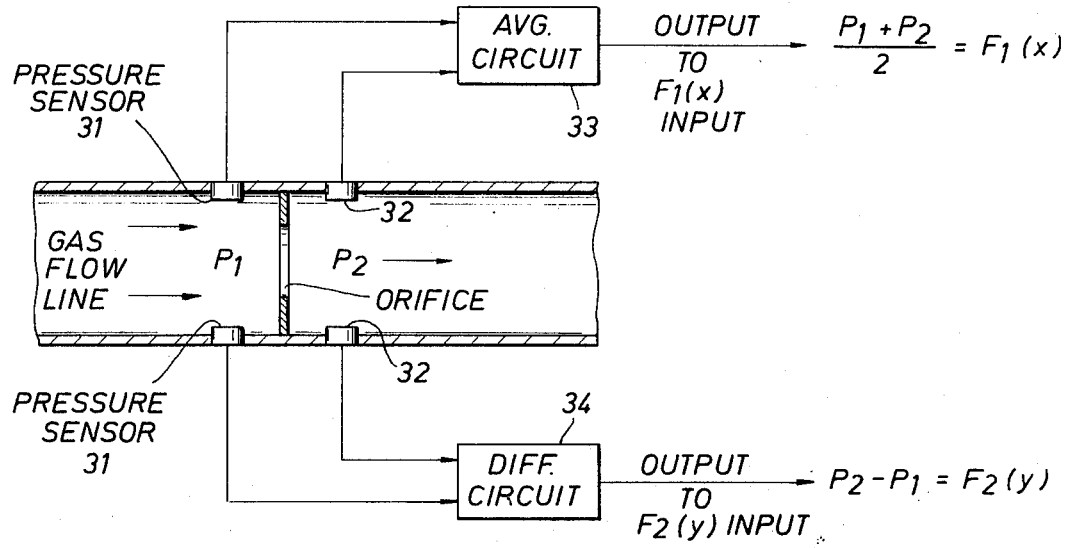
FIG. 3 is a schematic illustration of the apparatus of the present invention applied to compute the flow rate of gas in a pipe line.

One application in which the analog square root computer of the present invention may be utilized is in the area of computing the flow rate of gas through a flow line. In gas flow lines such as illustrated schematically in FIG. 3, it may be shown that the gas flow rate is given by:

$$R \approx \sqrt{(P)(h)}$$

where the quantity $P$ is equal to the average gas pressure on both sides of a flow line orifice 35, and the quantity $h$ is equal to the differential pressure across the orifice. Thus, for example, if the input $F_1(x)$ to the apparatus of the present invention were equal to the average pressure of flow in the gas line, and the input $F_2(y)$ were equal to the differential pressure across the orifice, then the output signal from the present invention would be proportional to the gas flow rate in the line. In the flow line of FIG. 3, pressure sensors 31 to the left of the orifice sense the pressure $P_1$ on the left-hand side of the orifice while pressure sensors 32 on the right-hand side of the orifice 35 sense a pressure $P_2$ which exists to the right of the orifice. For simplicity of illustration, four separate gas pressure sensors 31 and 32 have been illustrated, however, it will be understood by those skilled in the art that only two separate pressure sensors could be utilized for this purpose.

Outputs from the pressure sensors 31 and 32 on the upper side of the gas flow line are input to an average circuit 33. The average circuit 33 may be of any suitable type well known in the art which computes the average value of two voltage inputs. Thus, the output of the averaging circuit 33 is proportional to $P$, the absolute flowing pressure in the gas line. Similarly, the outputs of pressure sensors 31 and 32 can be input to a difference circuit 34 which may be a differential amplifier which computes and amplifies the difference of the voltage level inputs. Thus, the output of the difference circuit 34 is proportional to the differential pressure across the orifice in the gas flow line. The outputs of the average circuit 33 and the difference circuit 34 may then be input to the X- and Y-drive motors of the computing apparatus of the present invention. These inputs then drive the movable L-shaped brackets 19 and 20 to a position in which the aperture area is proportional to the product of the inputs. This in turn, will unbalance the bridge arrangement of FIG. 2 causing the diagonal drive motor 25 to drive the movable L-shaped bracket 24 into a position in which the bridge is balanced. At this time an output signal is developed across the potentiometer 27 which is indicative of the flow rate $R$ in the gas flow line of FIG. 3.

While the apparatus just discussed contemplates the use of electrical or electromechanical pressure transducers it will be appreciated that the behavior of the input device may be purely mechanical in nature in some applications. Thus, for example, if the static pressure sensor were a conventional spiral or helical coil which is responsive to average pressure in a flow line, and the differential pressure sensor were a U-shaped, mercury filled tube with an iron float, the mechanical motion of the helical coil and/or the float could be arranged to drive the L-shaped brackets, 19 and 20, of the device directly. This would, of course, provide an even more economical device since the drive motors 21 and 22 could be dispensed with. The latter modification is particularly advantageous for use with conventional equipment presently being employed in the field. It will be readily appreciated that substantial savings in time and money may be realized by employing the present invention with such existing equipment.

While there has been described what is at the present considered to be a preferred embodiment of this invention, it will be apparent to those skilled in the art that various changes and modifications may be made therein without departing from the invention, and it is therefore intended to cover all such changes and modifications as fall within the true spirit and scope of the invention in the following appended claims.

I claim:

1. Apparatus for computing the square root of the product of two functions comprising:
   an energy source;

a first variable aperture mask means having an aperture area which is exposed to said energy source and is variable in accordance with the product of two input functions;

a second variable aperture mask means having a square aperture area exposed to said energy source;

means responsive to the quantity of energy passing through said apertures in said mask means for varying the area of said second variable aperture mask means until it is equal to the area of said first variable aperture mask means, whereby the length of a side of the aperture of said second variable aperture mask means is equal to the square root of the product of said input functions; and means for measuring the length of the side of said aperture and for providing a signal proportional to the square root of the product of said two input functions.

2. The apparatus of claim 1 wherein said means for varying the area of said second variable aperture mask means includes:

means for sensing the quantity of energy passing through said first variable aperture mask means and generating a first signal representative thereof;

means for sensing the quantity of energy passing through said second variable aperture mask means and generating a second signal representative thereof;

means for comparing said first and second signals to generate an error signal proportional to the difference thereof; and means responsive to said error signal, for changing the aperture area of said second variable aperture mask means, while maintaining its square shape, in a manner tending to null side error signal.

3. The apparatus of claim 2 wherein said comparing means comprises a bridge comparison circuit and said first and second signal generating means comprise photosensitive detector cells.

4. The apparatus of claim 2 wherein said second variable aperture mask means includes two overlapping opaque sections forming a square aperture area and said means for changing the area of said second variable aperture mask means while maintaining its square shape includes means for moving said overlapping sections with respect to each other along a diagonal of said square aperture area.

5. Apparatus for computing the square root of the product of two functions comprising:

a first variable aperture light mask means having a first aperture dimension variable in accordance with a first function and a second aperture dimension variable according to a second function;

a second variable aperture light mask means having a square aperture shape;

a light source exposed to said first and second mask means;

means for generating a difference signal representative of the quantitative difference of the light passing through said apertures in each of said variable aperture mask means; and means responsive to said difference signal for varying the aperture area of said second mask means while maintaining its square aperture shape until said difference signal is minimized, thereby equalizing the aperture area of said light mask means and providing a signal proportional to the square root of the product of said functions.

6. Apparatus as defined in claim 5 for measuring the flow rate and volume of gas in a gas flow line wherein:

said first aperture dimension of said first variable aperture light mask means is variable in accordance with the average flow pressure in a gas flow line and said second aperture dimension is variable in accordance with the pressure differential between two spaced points in a gas flow line.

7. The apparatus of claim 5 wherein said means for generating a difference signal representative of the quantitative difference of light passing through said apertures in each of said variable aperture mask means includes photosensitive detector apparatus connected in a bridge circuit.

8. The apparatus of claim 5 wherein said second variable aperture light mask means includes two L-shaped opaque members overlapping to form said square aperture shape and said means for varying the aperture are of a said second variable aperture light mask means while maintaining its square aperture shape includes means for moving said overlapping L-shaped members with respect to each other along a diagonal of said square aperture.

* * * * *

UNITED STATES PATENT OFFICE
CERTIFICATE OF CORRECTION

Patent No. 3,634,672          Dated January 11, 1972

Inventor(s) Preston A. Weatherred, Jr.

It is certified that error appears in the above-identified patent and that said Letters Patent are hereby corrected as shown below:

Claim 2, line 32, change "side" to --said--.

Claim 8, line 37, change "are of a" to --area of--.

Signed and sealed this 5th day of September 1972.

(SEAL)
Attest:

EDWARD M. FLETCHER, JR.
Attesting Officer

ROBERT GOTTSCHALK
Commissioner of Patents